(12) United States Patent
Hirayama

(10) Patent No.: US 9,340,663 B2
(45) Date of Patent: *May 17, 2016

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventor: Michio Hirayama, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/359,615

(22) PCT Filed: Dec. 18, 2012

(86) PCT No.: PCT/JP2012/082802
§ 371 (c)(1),
(2) Date: May 21, 2014

(87) PCT Pub. No.: WO2013/094609
PCT Pub. Date: Jun. 27, 2013

(65) Prior Publication Data
US 2014/0323660 A1 Oct. 30, 2014

(30) Foreign Application Priority Data

Dec. 19, 2011 (JP) .................... 2011-277358

(51) Int. Cl.
| | | |
|---|---|---|
| C08L 15/00 | (2006.01) | |
| C08L 9/00 | (2006.01) | |
| B60C 1/00 | (2006.01) | |
| C08K 5/548 | (2006.01) | |

(52) U.S. Cl.
CPC . *C08L 15/00* (2013.01); *B60C 1/00* (2013.01); *B60C 1/0016* (2013.04); *C08K 5/548* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 5,189,109 A | 2/1993 | Imai et al. | |
| 5,219,938 A | 6/1993 | Imai et al. | |
| 5,902,856 A | 5/1999 | Suzuki et al. | |
| 8,865,836 B2 * | 10/2014 | Hirayama | 525/100 |
| 2006/0004143 A1 | 1/2006 | Inagaki et al. | |
| 2010/0048806 A1 | 2/2010 | Inagaki et al. | |
| 2010/0056710 A1 | 3/2010 | Oshima | |
| 2011/0136961 A1* | 6/2011 | Hattori et al. | 524/493 |
| 2011/0136962 A1 | 6/2011 | Hattori et al. | |
| 2011/0230613 A1 | 9/2011 | Hiro | |
| 2011/0245370 A1 | 10/2011 | Uesaka et al. | |
| 2011/0245398 A1 | 10/2011 | Hama et al. | |
| 2012/0172526 A1 | 7/2012 | Cheng et al. | |
| 2013/0012660 A1 | 1/2013 | Hirayama | |
| 2013/0018151 A1 | 1/2013 | Maeda et al. | |
| 2013/0303679 A1 | 11/2013 | Kunisawa et al. | |

FOREIGN PATENT DOCUMENTS

| | | |
|---|---|---|
| CN | 1706874 A | 12/2005 |
| CN | 101659729 A | 3/2010 |
| CN | 101659731 A | 3/2010 |
| CN | 101724185 A | 6/2010 |
| CN | 102093602 A | 6/2011 |
| CN | 102212218 A | 10/2011 |
| EP | 0 334 042 A2 | 9/1989 |
| JP | 1-217047 A | 8/1989 |
| JP | 1-284504 A | 11/1989 |
| JP | 2002-201307 A | 7/2002 |
| JP | 2005-225946 A | 8/2005 |
| JP | 2005-344039 A | 12/2005 |
| JP | 2007-112994 A | 5/2007 |
| JP | 2008-31244 A | 2/2008 |
| JP | 2010-77415 A | 4/2010 |
| JP | 2010-126656 A | 6/2010 |
| JP | 2011-225809 A | 11/2011 |
| JP | 2013-18813 A | 1/2013 |
| JP | 2013-32497 A | 2/2013 |
| JP | 2013-36032 A | 2/2013 |
| WO | WO 2012/128320 A1 | 9/2012 |

OTHER PUBLICATIONS

PCT/ISA/210—International Search Report mailed on Apr. 16, 2013, issued in PCT/JP2012/082802.
Non-Final Office Action issued Dec. 9, 2015, in U.S. Appl. No. 14/374,298.

* cited by examiner

*Primary Examiner* — Jeffrey Mullis
(74) *Attorney, Agent, or Firm* — Birch, Stewart, Kolasch & Birch, LLP

(57) ABSTRACT

The present invention provides a rubber composition for tires which achieves a balanced improvement in rolling resistance, abrasion resistance, and wet-skid performance while providing excellent processability; and a pneumatic tire including the rubber composition. The present invention relates to a rubber composition for tires, including: a modified diene rubber A which has been terminally modified with a specific acrylamide compound; a modified diene rubber B which has been modified with a silicon or tin compound and a specific modifying compound or with the modifying compound; and a silane coupling agent containing a mercapto group, the modified diene rubbers A and B, taken as a whole, having a weight average molecular weight falling within a specific range.

11 Claims, No Drawings

RUBBER COMPOSITION FOR TIRE, AND PNEUMATIC TIRE

TECHNICAL FIELD

The present invention relates to a rubber composition for tires, and a pneumatic tire including the same.

BACKGROUND ART

Pneumatic tires for automobiles these days are required to have a wide variety of properties, including fuel economy as well as abrasion resistance, wet-skid performance and the like. Various methods have been devised to improve these properties. For example, silica-containing rubber compositions are used as fuel-efficient formulations. They further contain silane coupling agents because silica has lower affinity for rubber than carbon black does.

Though the use of bis(3-triethoxysilylpropyl)disulfide or bis(3-triethoxysilylpropyl)tetrasulfide, which are widely used as silane coupling agents, increases the dispersibility of silica and thus improves mechanical properties, the silane coupling agent needs to be added in a large amount, which leads to a great increase in cost. In addition, even the addition of a large amount of the silane coupling agent results in insufficient dispersibility in some cases. Furthermore, kneading at a high temperature for sufficient reaction between silica and the silane coupling agent tends to cause gelation of rubber or compound scorch.

Silane coupling agents containing a mercapto group, on the other hand, are known for being highly reactive and effective in increasing the dispersibility of silica. With these silane coupling agents, however, scorch time tends to be shortened so that compound scorch can easily occur in a final kneading step or an extrusion step. Thus, they are difficult to use particularly in SBR-containing systems, which are more likely to scorch than low-polarity rubbers such as NB and BR.

Patent Literature 1 discloses a rubber composition for tires which contains silica and which can enhance wet grip performance without deterioration in rolling resistance and abrasion resistance. This rubber composition, however, still has room for improvement in terms of achieving a balanced improvement in these properties while maintaining good processability.

CITATION LIST

Patent Literature

Patent Literature 1: JP 2008-31244 A

SUMMARY OF INVENTION

Technical Problem

The present invention aims to provide a rubber composition for tires which can solve the above problems and achieve a balanced improvement in rolling resistance, abrasion resistance, and wet-skid performance while providing excellent processability. The present invention also aims to provide a pneumatic tire including the rubber composition.

Solution to Problem

The present invention relates to a rubber composition for tires, comprising: a modified diene rubber A which has been modified with an acrylamide compound represented by the following Formula (I):

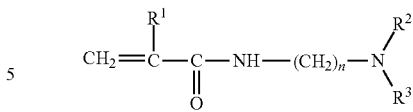

wherein $R^1$ represents hydrogen or a methyl group; $R^2$ and $R^3$ each represent an alkyl group; and n represents an integer; a modified diene rubber B which has been modified with a silicon or tin compound represented by the Formula (II) below and a modifying compound represented by the Formula (III) below or with a modifying compound represented by the Formula (III) below:

$$R_aMX_b \quad (II)$$

wherein R represents an alkyl group, an alkenyl group, a cycloalkenyl group, or an aromatic hydrocarbon group; M represents silicon or tin; X represents a halogen; a represents an integer of 0 to 2; and b represents an integer of 2 to 4;

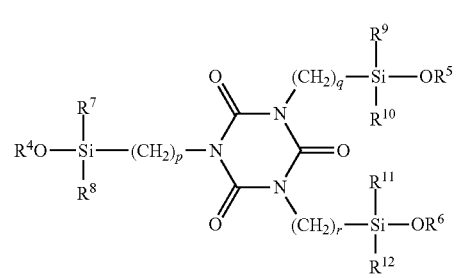

wherein $R^4$ to $R^6$ are the same as or different from one another, each representing a C1 to C8 alkyl group; $R^7$ to $R^{12}$ are the same as or different from one another, each representing a C1 to C8 alkoxy or alkyl group; and p to r are the same as or different from one another, each representing an integer of 1 to 8; and a silane coupling agent containing a mercapto group, the modified diene rubbers A and B, taken as a whole, having a weight average molecular weight of 300,000 to 1,400,000.

Preferably, the modified diene rubbers A and B comprise a mixture obtained by polymerizing a conjugated diene monomer alone or with an aromatic vinyl monomer in the presence of an alkali metal catalyst in a hydrocarbon solvent to produce an active alkali metal-terminated conjugated diene polymer, and reacting the conjugated diene polymer with the acrylamide compound and with a combination of the silicon or tin compound and the modifying compound or the modifying compound.

Preferably, in the modifying compound, each of $R^4$ to $R^6$ is a methyl, ethyl, propyl, or butyl group; each of $R^7$ to $R^{12}$ is a methoxy, ethoxy, propoxy, or butoxy group; and each of p to r is an integer of 2 to 5.

Preferably, the silane coupling agent containing a mercapto group is at least one of a compound represented by the Formula (1) below and a compound containing a linking unit A represented by the Formula (2) below and a linking unit B represented by the Formula (3) below:

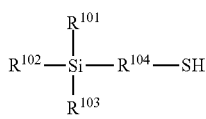
(1)

wherein $R^{101}$ to $R^{103}$ each represent a branched or unbranched C1 to C12 alkyl group, a branched or unbranched C1 to C12 alkoxy group, or a group represented by —O—$(R^{111}$—O$)_z$—$R^{112}$ where z $R^{111}$s each represent a branched or unbranched C1 to C30 divalent hydrocarbon group, and z $R^{111}$s may be the same as or different from one another; $R^{112}$ represents a branched or unbranched C1 to C30 alkyl group, a branched or unbranched C2 to C30 alkenyl group, a C6 to C30 aryl group, or a C7 to C30 aralkyl group; and z represents an integer of 1 to 30, and $R^{101}$ to $R^{103}$ may be the same as or different from one another; and $R^{104}$ represents a branched or unbranched C1 to C6 alkylene group;

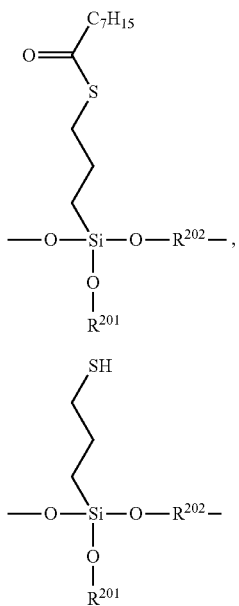

(2)

(3)

wherein $R^{201}$ represents hydrogen, a halogen, a branched or unbranched C1 to C30 alkyl group, a branched or unbranched C2 to C30 alkenyl group, a branched or unbranched C2 to C30 alkynyl group, or the alkyl group in which a terminal hydrogen atom is replaced with a hydroxy or carboxy group; and $R^{202}$ represents a branched or unbranched C1 to C30 alkylene group, a branched or unbranched C2 to C30 alkenylene group, or a branched or unbranched C2 to C30 alkynylene group, provided that $R^{201}$ and $R^{202}$ together may form a ring structure.

The present invention also relates to a pneumatic tire, comprising a tread formed from the rubber composition.

Advantageous Effects of Invention

The rubber composition for tires according to the present invention includes: a modified diene rubber A which has been terminally modified with a specific acrylamide compound; a modified diene rubber B which has been modified with a silicon or tin compound and a specific modifying compound or with the modifying compound; and a silane coupling agent containing a mercapto group, wherein the rubbers A and B, taken as a whole, have a weight average molecular weight falling within a specific range. Thus, the rubber composition can achieve a balanced improvement in rolling resistance, abrasion resistance, and wet-skid performance while providing excellent processability.

DESCRIPTION OF EMBODIMENTS

The rubber composition for tires of the present invention contains as a rubber component a blend of the modified diene rubbers A and B described later, having a total weight average molecular weight falling within a specific range, and also contains a silane coupling agent containing a mercapto group. This allows silica to react so well with the silane coupling agent that silica can be uniformly dispersed, making it possible to markedly improve the balance among rolling resistance, abrasion resistance, and wet-skid performance. The rubber composition also has a good scorch time, despite containing the silane coupling agent containing a mercapto group. This results in excellent processability. Thus, in the present invention, the combined use of the blend and the silane coupling agent containing a mercapto group in a silica-containing rubber compound can synergistically improve the balance among rolling resistance, abrasion resistance, and wet-skid performance while providing good processability.

This improving effect is assumed to be due to the following actions.

The aforementioned blend of the modified diene rubbers A and B has a strong interaction with both fillers, carbon black and silica, without forming a covalent bond therewith. Moreover, although the rubber A terminally modified with the acrylamide compound can increase the interaction with silica and carbon black, the use of the rubber A alone cannot be expected to provide the effect of breaking filler agglomerates because the ratio of low molecular weight ingredients is large in this case. As a result, it is difficult to increase the dispersibility of filler. In contrast, in the present invention, since the rubber B terminally modified with the modifying compound is further used, the interaction with filler, especially with silica, can then be further increased. In addition, the modified terminal groups of the rubber B molecules interact with each other while making an interaction with silica, so that polymers are coupled to have a higher molecular weight. Then, filler agglomerates are sufficiently broken, and therefore the rubbers A and B efficiently and synergistically exert the effect of increasing the dispersibility of filler.

Furthermore, conventional silane coupling agents used in the rubber industry, such as bis(3-triethoxysilylpropyl)tetrasulfide, promote crosslinking at a high kneading temperature (e.g., at 130° C. or higher) and thus make it difficult to process the composition. In the present invention, in contrast, since a silane coupling agent containing a mercapto group is used together with the blend, such a problem can be prevented. Consequently, the reactivity between silica and the silane coupling agent is enhanced and thus the dispersibility of silica is further increased. The effect of the actions mentioned above is assumed to greatly increase the dispersibility of filler and thus lead to a remarkable improvement in the balance among rolling resistance, abrasion resistance, and wet-skid performance while providing good processability.

The rubber composition of the present invention contains modified diene rubbers A and B, and the rubbers A and B, taken as a whole, have a weight average molecular weight falling within a specific range.

The modified diene rubber A refers to a diene rubber modified with an acrylamide compound represented by the following Formula (I):

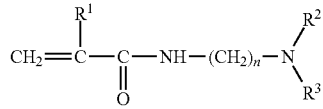

(I)

wherein $R^1$ represents hydrogen or a methyl group; $R^2$ and $R^3$ each represent an alkyl group; and n represents an integer. The diene rubber has a polymer terminal modified with the acrylamide compound.

In Formula (I), each of $R^2$ and $R^3$ is preferably a C1 to C4 alkyl group, and n is preferably an integer of 2 to 5.

Specific examples of the acrylamide compound include N,N-dimethylaminomethylacrylamide, N,N-ethylmethylaminomethylacrylamide, N,N-diethylaminomethylacrylamide, N,N-ethylpropylaminomethylacrylamide, N,N-dipropylaminomethylacrylamide, N,N-butylpropylaminomethylacrylamide, N,N-dibutylaminomethylacrylamide, N,N-dimethylaminoethylacrylamide, N,N-ethylmethylaminoethylacrylamide, N,N-diethylaminoethylacrylamide, N,N-ethylpropylaminoethylacrylamide, N,N-dipropylaminoethylacrylamide, N,N-butylpropylaminoethylacrylamide, N,N-dibutylaminoethylacrylamide, N,N-dimethylaminopropylacrylamide, N,N-ethylmethylaminopropylacrylamide, N,N-diethylaminopropylacrylamide, N,N-ethylpropylaminopropylacrylamide, N,N-dipropylaminopropylacrylamide, N,N-butylpropylaminopropylacrylamide, N,N-dibutylaminopropylacrylamide, N,N-dimethylaminobutylacrylamide, N,N-ethylmethylaminobutylacrylamide, N,N-diethylaminobutylacrylamide, N,N-ethylpropylaminobutylacrylamide, N,N-dipropylaminobutylacrylamide, N,N-butylpropylaminobutylacrylamide, and N,N-dibutylaminobutylacrylamide, and the corresponding methacrylamides. In particular, N,N-dimethylaminopropylacrylamide is preferred in terms of improving the balance between the aforementioned properties.

The modified diene rubber B refers to a diene rubber modified with a silicon or tin compound represented by the Formula (II) below and a modifying compound represented by the Formula (III) below, or a diene rubber modified with a modifying compound represented by the Formula (III) below. The former diene rubber has a polymer terminal that is coupled with the silicon or tin compound and then modified with the modifying compound. The latter diene rubber has a polymer terminal modified with the modifying compound.

$$R_aMX_b \quad \text{(II)}$$

In Formula (II), R represents an alkyl, alkenyl, cycloalkenyl, or aromatic hydrocarbon group; M represents silicon or tin; X represents halogen; a represents an integer of 0 to 2; and b represents an integer of 2 to 4.

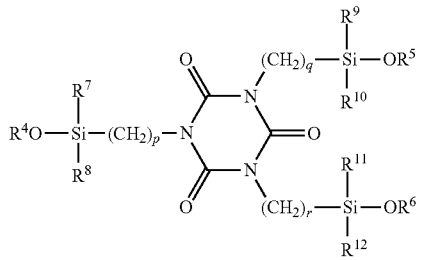

(III)

In Formula (III), $R^4$ to $R^6$ are the same as or different from one another and each represent a C1 to C8 alkyl group; $R^7$ to $R^{12}$ are the same as or different from one another and each represent a C1 to C8 alkoxy or alkyl group; and p to r are the same as or different from one another and each represent an integer of 1 to 8.

The silicon or tin compound represented by Formula (II) functions as a coupling agent for diene rubbers. Examples of the silicon compounds include tetrachlorosilicon, tetrabromosilicon, methyltrichlorosilicon, butyltrichlorosilicon, dichlorosilicon, and bistrichlorosilylsilicon. Examples of the tin compounds include tetrachlorotin, tetrabromotin, methyltrichlorotin, butyltrichlorotin, dichlorotin, and bistrichlorosilyltin.

In Formula (III), each of $R^4$ to $R^6$ is preferably a methyl, ethyl, propyl or butyl group, each of $R^7$ to $R^{12}$ is preferably a methoxy, ethoxy, propoxy or butoxy group, and each of p to r is preferably an integer of 2 to 5. Such a structure improves the balance between the aforementioned properties.

Specific examples of the modifying compound represented by Formula (III) include 1,3,5-tris(3-trimethoxysilylpropyl) isocyanurate, 1,3,5-tris(3-triethoxysilylpropyl)isocyanurate, 1,3,5-tris(3-tripropoxysilylpropyl)isocyanurate, and 1,3,5-tris(3-tributoxysilylpropyl)isocyanurate. In particular, 1,3,5-tris(3-trimethoxysilylpropyl)isocyanurate is preferred in terms of improving the balance between the aforementioned properties.

The modified diene rubbers A and B may, for example, be obtained by individually preparing the rubbers A and B and then blending them. In this case, for example, each of the modified diene rubbers A and B may be prepared as described below.

The modified diene rubber A may be prepared by polymerizing a conjugated diene monomer alone or with an aromatic vinyl monomer in the presence of an alkali metal catalyst in a hydrocarbon solvent to produce an active alkali metal-terminated conjugated diene polymer, and reacting the conjugated diene polymer with the acrylamide compound represented by Formula (I).

Examples of the conjugated diene monomers include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene or isoprene is preferred among these.

Examples of the aromatic vinyl monomers include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferred among these.

The hydrocarbon solvent is not particularly limited as long as it does not deactivate the alkali metal catalyst. Examples thereof include aliphatic hydrocarbons, aromatic hydrocarbons, and alicyclic hydrocarbons. Specific examples thereof include those having 3 to 12 carbon atoms, such as propane, n-butane, iso-butane, n-pentane, iso-pentane, n-hexane, cyclohexane, benzene, toluene, and xylene.

Examples of the alkali metal catalysts include metals such as lithium, sodium, potassium, rubidium, and cesium, and hydrocarbon compounds containing these metals. Preferred alkali metal catalysts include lithium or sodium compounds having 2 to 20 carbon atoms. Specific examples thereof include ethyllithium, n-propyllithium, iso-propyllithium, n-butyllithium, sec-butyllithium, t-octyllithium, n-decyllithium, and phenyllithium.

The conjugated diene monomer may be used alone or in combination with the aromatic vinyl monomer for the polymerization. When the conjugated diene monomer and the aromatic vinyl monomer are used in combination, the ratio of these monomers [(conjugated diene monomer)/(aromatic vinyl monomer)] is preferably 50/50 to 90/10, and more preferably 55/45 to 85/15, on a mass basis.

In the polymerization, materials generally used, such as an alkali metal catalyst, a hydrocarbon solvent, a randomizer, an agent for controlling the vinyl bond content in conjugated diene units, and the like may be used. The method for producing the polymer is not particularly limited.

Various Lewis basic compounds may be used to control the vinyl bond content in the conjugated diene part. Considering the availability for industrial purposes, ether compounds and tertiary amines are preferred. Examples of the ether compounds include cyclic ethers such as tetrahydrofuran, tetrahydropyran, and 1,4-dioxane; aliphatic monoethers such as diethyl ether and dibutyl ether; and aliphatic diethers such as ethylene glycol dimethyl ether. Examples of the tertiary amine compounds include triethylamine and tripropylamine.

When the acrylamide compound is added to the active alkali metal-terminated conjugated diene polymer to produce the modified diene rubber A, the amount of the acrylamide compound is usually 0.05 to 10 mol, preferably 0.2 to 2 mol, per mol of the alkali metal catalyst used for the addition of the alkali metal.

Since the reaction between the acrylamide compound and the active alkali metal-terminated conjugated diene polymer rapidly proceeds, the reaction temperature and the reaction time can be selected from wide ranges. Typically, the reaction temperature ranges from room temperature to 100° C. and the reaction time ranges from few seconds to several hours. Any method may be employed for the reaction as long as the active conjugated diene polymer and the acrylamide compound are brought into contact. For example, mention may be made of a method in which the diene polymer is prepared using the alkali metal catalyst, and a predetermined amount of the acrylamide compound is then added to the polymer solution.

After completion of the reaction, coagulation may be carried out in the reaction solvent by a conventional technique used in the production of rubber by solution polymerization, such as by adding a coagulant or by steam coagulation, without altering the technique. Also, the coagulation temperature is not at all limited. The resulting modified diene rubber A has a molecular terminal into which the acrylamide compound has been introduced.

Meanwhile, the modified diene rubber B may be prepared by polymerizing a conjugated diene monomer alone or with an aromatic vinyl monomer in the presence of an alkali metal catalyst in a hydrocarbon solvent to produce an active alkali metal-terminated conjugated diene polymer, and (a) reacting the conjugated diene polymer with the silicon or tin compound (coupling agent) represented by Formula (II) and then with the modifying compound represented by Formula (III); or (b) reacting the conjugated diene polymer with the modifying compound represented by Formula (III).

The active alkali metal-terminated conjugated diene polymer may be obtained in the same manner as in the preparation of the modified diene rubber A. In the step (a), the silicon or tin compound is usually used in the range of 0.01 to 0.4 equivalents of halogen atoms per equivalent of the terminal alkali metal atom of the active conjugated diene polymer. The coupling reaction is usually carried out at a temperature range of 20° C. to 100° C. The reaction of the modifying compound in the step (a) or (b) may also be carried out in the same manner as in the reaction of the acrylamide compound mentioned above. The modified diene rubber B thus obtained has a molecular terminal into which the modifying compound has been introduced.

Another preferred embodiment of the modified diene rubbers A and B is a mixture obtained by preparing the rubbers A and B by a single batch process. In this case, for example, the mixture may be prepared by reacting the active alkali metal-terminated conjugated diene polymer with the acrylamide compound and with a combination of the silicon or tin compound and the modifying compound or the modifying compound.

More specifically, the mixture may be prepared by, for example, preparing the active alkali metal-terminated conjugated diene polymer by the same method as described above, followed either (c) by adding to the polymer solution the acrylamide compound, then optionally the silicon or tin compound (coupling agent), and then the modifying compound, or (d) by adding the acrylamide compound, the modifying compound, and optionally the silicon or tin compound simultaneously to the polymer solution.

In such cases, the reactions with the acrylamide compound and with the modifying compound and the coupling reaction may be carried out in the same manner as mentioned above. The resulting mixture contains the modified diene rubber A having a molecular terminal into which the acrylamide compound has been introduced, and the modified diene rubber B having a molecular terminal into which the modifying compound has been introduced.

The weight average molecular weight (Mw) of the modified diene rubbers A and B, taken as a whole, used in the rubber composition of the present invention (the weight average molecular weight measured for the entire composition consisting of the modified diene rubbers A and B) is 300,000 or more, preferably 500,000 or more, and more preferably 600,000 or more. The Mw is 1,400,000 or less, preferably 1,200,000 or less, and more preferably 1,000,000 or less. With a Mw in the range mentioned above, the balance between the aforementioned properties can be improved.

The molecular weight distribution (Mw/Mn) of the modified diene rubbers A and B, taken as a whole, is preferably 4 or smaller, more preferably 3.5 or smaller, and still more preferably 3 or smaller. If the Mw/Mn is more than 4, the dispersibility of filler tends to deteriorate, leading to an increase in tan δ (deterioration in rolling resistance properties).

As used herein, the number average molecular weight (Mn) and the weight average molecular weight (Mw) of the two rubbers and the aromatic vinyl polymer mentioned later are determined by a gel permeation chromatograph (GPC) (GPC-8000 series produced by TOSOH CORPORATION, detector: differential refractometer, column: TSKGEL SUPERMALTPORE HZ-M produced by TOSOH CORPORATION) relative to polystyrene standards.

Each of the modified diene rubbers A and B is preferably a modified polybutadiene rubber (modified BR) or a modified styrene butadiene rubber (modified SBR), and more preferably a modified SBR, in terms of improving the balance between the aforementioned properties.

In the case that the modified diene rubbers A and B are modified SBRs, the vinyl bond content in the butadiene part of the rubbers A and B, taken as a whole, is preferably 20% by mass or more, and more preferably 25% by mass or more. Modified diene rubbers having a vinyl bond content less than 20% by mass tend to be difficult to polymerize (produce). The vinyl bond content is also preferably 60% by mass or less, and more preferably 55% by mass or less. If the vinyl bond content is more than 60% by mass, then the dispersibility of filler tends to deteriorate. The vinyl bond content (1,2-butadiene unit content) herein can be determined by infrared absorption spectrometry.

In the case that the modified diene rubbers A and B are modified SBRs, the styrene content of the rubbers A and B, taken as a whole, is preferably 10% by mass, more preferably 15% by mass or more, and still more preferably 25% by mass or more. If the styrene content is less than 10% by mass, wet-skid performance tends to deteriorate. The styrene content is also preferably 50% by mass or less, and more preferably 45% by mass or less. If the styrene content is more than 50% by mass, abrasion resistance tends to deteriorate. The styrene content herein is determined by $^1$H-NMR.

In the rubber composition of the present invention, the blending ratio of the modified diene rubbers A and B (mass ratio of A/B) is preferably 5/95 to 95/5, more preferably 10/90 to 90/10, and still more preferably 20/80 to 80/20. The ratio below the lower limit tends to result in a reduction in rolling resistance properties, whereas the ratio above the upper limit tends to result in a reduction in abrasion resistance. In both cases, the balance between the aforementioned properties tends to deteriorate.

Moreover, the combined content of the modified diene rubbers A and B based on 100% by mass of the rubber component of the rubber composition is preferably 2% by mass or more, more preferably 5% by mass or more, and still more preferably 10% by mass or more. If the combined content is less than 2% by mass, rolling resistance properties and abrasion resistance may not be sufficiently improved. The upper limit of the combined content is not particularly limited, and is preferably 90% by mass or less, and more preferably 80% by mass or less although it may be 100% by mass.

Other rubber materials may be contained in the rubber component in the present invention, such as diene rubbers including natural rubber (NR), polyisoprene rubber (IR), polybutadiene rubber (BR), styrene butadiene rubber (SBR), acrylonitrile butadiene rubber (NBR), chloroprene rubber (CR), butyl rubber (IIR), halogenated butyl rubber (X-IIR), and styrene-isoprene-butadiene copolymer rubber (SIBR). In particular, SBR or BR is preferably used because they are highly compatible and highly contribute to better balance between the aforementioned properties.

The SBR may be one commonly used in the tire industry, such as emulsion polymerized styrene butadiene rubber (E-SBR) and solution polymerized styrene butadiene rubber (S-SBR). Examples of BR include BRs with high cis content and BRs containing syndiotactic polybutadiene crystals.

In the case that SBR (unmodified) is used, the SBR content is preferably 20% by mass or more, more preferably 40% by mass or more, and still more preferably 50% by mass or more. With an SBR content less than 20% by mass, processability tends to deteriorate. The SBR content is preferably 90% by mass or less, more preferably 80% by mass or less, and still more preferably 70% by mass or less. With an SBR content more than 90% by mass, silica tends not to easily disperse, and thus the balance between wet-skid performance and abrasion resistance tends to deteriorate.

Here, the suitable styrene content of SBR (unmodified) is as mentioned when the modified diene rubbers A and B are modified SBRs.

In the case that a modified SBR and/or unmodified SBR are used in the present invention, the total SBR content based on 100% by mass of the rubber component is preferably 75% by mass or more, more preferably 85% by mass or more, still more preferably 95% by mass or more, and most preferably 100% by mass.

If the total content is less than 75% by mass, abrasion resistance tends to be lowered.

In the case that BR (unmodified) is used, the BR content is preferably 5% by mass or more, and more preferably 10% by mass or more. With a BR content less than 5% by mass, abrasion resistance tends to deteriorate. The BR content is preferably 40% by mass or less, and more preferably 30% by mass or less. With a BR content more than 40% by mass, wet-skid performance tends to be reduced.

The rubber composition of the present invention preferably contains carbon black and/or silica (preferably both) as filler.

The use of carbon black increases reinforcement and improves abrasion resistance. The carbon black is not particularly limited, and examples thereof include GPF, FEF, HAF, ISAF, and SAF. The carbon black may be used alone, or two or more thereof may be used in combination.

The nitrogen adsorption specific surface area ($N_2SA$) of carbon black is preferably 50 $m^2/g$ or greater, and more preferably 100 $m^2/g$ or greater. A carbon black with a $N_2SA$ smaller than 50 $m^2/g$ tends not to provide sufficient reinforcement. The $N_2SA$ of carbon black is preferably 200 $m^2/g$ or smaller, and more preferably 150 $m^2/g$ or smaller. A carbon black with a $N_2SA$ more than 200 $m^2/g$ tends not to easily disperse, and therefore rolling resistance properties tend to deteriorate.

Here, the nitrogen adsorption specific surface area of carbon black is determined in accordance with JIS K6217-2:2001.

The dibutyl phthalate (DBP) oil absorption of carbon black is preferably 60 ml/100 g or more, and more preferably 100 ml/100 g or more. A carbon black with a DBP oil absorption less than 60 ml/100 g tends not to provide sufficient reinforcement. The DBP oil absorption of carbon black is preferably 150 ml/100 g or less, and more preferably 120 ml/100 g or less. A carbon black with a DBP oil absorption more than 150 ml/100 g tends to result in lower processability and dispersibility.

Here, the DBP oil absorption of carbon black is determined by JIS K6217-4:2001.

The amount of carbon black per 100 parts by mass of the rubber component is preferably 10 parts by mass or more, more preferably 20 parts by mass or more, and sill more preferably 30 parts by mass or more. Less than 10 parts by mass of carbon black tends not to provide sufficient reinforcement. The amount of carbon black is also preferably 100 parts by mass or less, more preferably 80 parts by mass or less, and still more preferably 60 parts by mass or less. Carbon black in an amount more than 100 parts by mass tends not to easily disperse, and thus rolling resistance properties tend to deteriorate.

The use of silica improves rolling resistance properties while increasing reinforcement. Examples of silica include silica produced by a wet process and silica produced by a dry process. The silica may be used alone, or two or more thereof may be used in combination.

The nitrogen adsorption specific surface area ($N_2SA$) of silica is preferably 120 m$^2$/g or greater, and more preferably 150 m$^2$/g or greater. A silica with a $N_2SA$ smaller than 120 m$^2$/g tends not to provide sufficient reinforcement. The $N_2SA$ of silica is also preferably 250 m$^2$/g or smaller, and more preferably 200 m$^2$/g or smaller. A silica with a $N_2SA$ greater than 250 m$^2$/g tends to have lower dispersibility, which increases hysteresis loss, thus deteriorating rolling resistance properties.

Here, the $N_2SA$ of silica is determined in accordance with the BET method of ASTM D3037-81.

The amount of silica per 100 parts by mass of the rubber component is preferably 20 parts by mass or more, more preferably 25 parts by mass or more, and still more preferably 35 parts by mass or more. Less than 20 parts by mass of silica tends not to provide sufficient reinforcement. The amount of silica is also preferably 120 parts by mass or less, more preferably 100 parts by mass or less, and still more preferably 70 parts by mass or less. Silica in an amount more than 120 parts by mass tends to have lower dispersibility, thus deteriorating rolling resistance properties.

In the rubber composition of the present invention, the combined amount of carbon black and silica per 100 parts by mass of the rubber component is preferably 40 parts by mass or more, and more preferably 70 parts by mass or more. A combined amount less than 40 parts by mass tends not to provide sufficient reinforcement. The combined amount is preferably 150 parts by mass or less, and more preferably 110 parts by mass or less. The fillers in a combined amount more than 150 parts by mass tend to have lower dispersibility.

In the case that both fillers, carbon black and silica, are used, the proportion of silica in the total of carbon black and silica is preferably 45% by mass or more, and more preferably 50% by mass or more. Conversely, the proportion of silica is preferably 90% by mass or less, and more preferably 80% by mass or less. A proportion of silica falling within the range mentioned above allows the effects of the present invention to be sufficiently achieved.

In the present invention, a silane coupling agent containing a mercapto group is used. The addition of a combination of silica and a silane coupling agent containing a mercapto group to the modified diene rubbers A and B enables the simultaneous achievement of dispersibility of silica and scorch resistance, thereby markedly improving the balance among rolling resistance, abrasion resistance, and wet-skid performance while providing good processability.

The silane coupling agent containing a mercapto group may suitably be a compound represented by the Formula (1) below and/or a compound containing a linking unit A represented by the Formula (2) below and a linking unit B represented by the Formula (3) below.

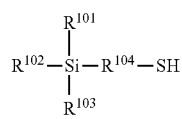
(1)

In Formula (1), $R^{101}$ to $R^{103}$ each represent a branched or unbranched C1 to C12 alkyl group, a branched or unbranched C1 to C12 alkoxy group, or a group represented by —O—$(R^{111}$—O$)_z$—$R^{112}$ where z $R^{111}$s each represent a branched or unbranched C1 to C30 divalent hydrocarbon group, and z $R^{111}$s may be the same as or different from one another; $R^{112}$ represents a branched or unbranched C1 to C30 alkyl group, a branched or unbranched C2 to C30 alkenyl group, a C6 to C30 aryl group, or a C7 to C30 aralkyl group; and z represents an integer of 1 to 30, and $R^{101}$ to $R^{103}$ may be the same as or different from one another; and $R^{104}$ represents a branched or unbranched C1 to C6 alkylene group.

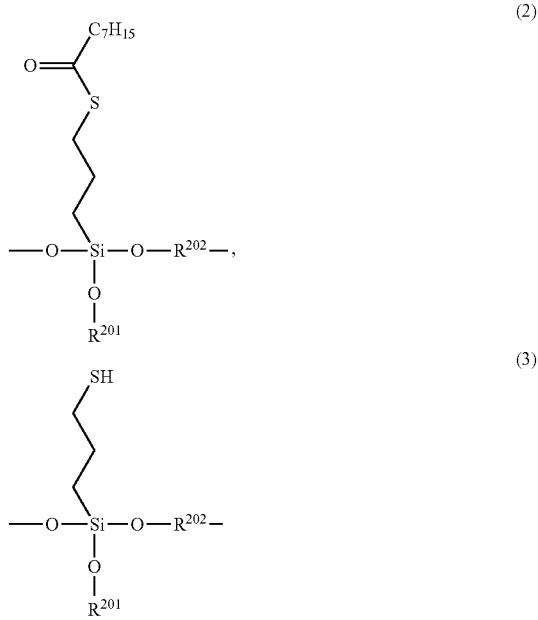

In Formulae (2) and (3), $R^{201}$ represents hydrogen, a halogen, a branched or unbranched C1 to C30 alkyl group, a branched or unbranched C2 to C30 alkenyl group, a branched or unbranched C2 to C30 alkynyl group, or the alkyl group in which a terminal hydrogen atom is replaced with a hydroxy or carboxy group; and $R^{202}$ represents a branched or unbranched C1 to C30 alkylene group, a branched or unbranched C2 to C30 alkenylene group, or a branched or unbranched C2 to C30 alkynylene group, provided that $R^{201}$ and $R^{202}$ together may form a ring structure.

In the following, the compound represented by Formula (1) is described.

The use of the compound represented by Formula (1) enables silica to disperse well and thus markedly improves fuel economy, abrasion resistance, and wet-skid performance. Also, the use of the compound provides a good scorch time and therefore excellent processability.

$R^{101}$ to $R^{103}$ each represent a branched or unbranched C1 to C12 alkyl group, a branched or unbranched C1 to C12 alkoxy group, or a group represented by —O—$(R^{111}$—O$)_z$—$R^{112}$. In terms of achieving the effects of the present invention well, at least one of $R^{101}$ to $R^{103}$ is preferably a group represented by —O—$(R^{111}$—O$)_z$—$R^{112}$; more preferably, two of $R^{101}$ to $R^{103}$ are groups represented by —O—$(R^{111}$—O$)_z$—$R^{112}$ while the other is a branched or unbranched C1 to C12 alkoxy group.

Examples of the branched or unbranched C1 to C12 (preferably C1 to C5)alkyl groups for $R^{101}$ to $R^{103}$ include methyl, ethyl, n-propyl, isopropyl, n-butyl, iso-butyl, sec-butyl, tert-butyl, pentyl, hexyl, heptyl, 2-ethylhexyl, octyl, and nonyl groups.

Examples of the branched or unbranched C1 to C12 (preferably C1 to C5)alkoxy groups for $R^{101}$ to $R^{103}$ include methoxy, ethoxy, n-propoxy, isopropoxy, n-butoxy, iso-butoxy, sec-butoxy, tert-butoxy, pentyloxy, hexyloxy, heptyloxy, 2-ethylhexyloxy, octyloxy, and nonyloxy groups.

In the group represented by $(R^{111}-O)_z-R^{112}$ for $R^{101}$ to $R^{103}$, $R^{111}$ represents a branched or unbranched C1 to C30 (preferably C1 to C15, more preferably C1 to C3) divalent hydrocarbon group. Examples of the hydrocarbon groups include branched or unbranched C1 to C30 alkylene groups, branched or unbranched C2 to C30 alkenylene groups, branched or unbranched C2 to C30 alkynylene groups, and C6 to C30 arylene groups. Preferred among these are branched or unbranched C1 to C30 alkylene groups.

Examples of the branched or unbranched C1 to C30 (preferably C1 to C15, more preferably C1 to C3)alkylene groups for $R^{111}$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups.

Examples of the branched or unbranched C2 to C30 (preferably C2 to C15, more preferably C2 to C3)alkenylene groups for $R^{111}$ include vinylene, 1-propenylene, 2-propenylene, 1-butenylene, 2-butenylene, 1-pentenylene, 2-pentenylene, 1-hexenylene, 2-hexenylene, and 1-octenylene groups.

Examples of the branched or unbranched C2 to C30 (preferably C2 to C15, more preferably C2 to C3)alkynylene groups for $R^{111}$ include ethynylene, propynylene, butynylene, pentynylene, hexynylene, heptynylene, octynylene, nonynylene, decynylene, undecynylene, and dodecynylene groups.

Examples of the C6 to C30 (preferably C6 to C15) arylene groups for $R^{111}$ include phenylene, tolylene, xylylene, and naphthylene groups.

z represents an integer of 1 to 30 (preferably 2 to 20, more preferably 3 to 7, and still more preferably 5 to 6).

$R^{112}$ represents a branched or unbranched C1 to C30 alkyl group, a branched or unbranched C2 to C30 alkenyl group, a C6 to C30 aryl group, or a C7 to C30 aralkyl group. Especially, $R^{112}$ is preferably a branched or unbranched C1 to C30 alkyl group.

Examples of the branched or unbranched C1 to C30 (preferably C3 to C25, more preferably C10 to C15)alkyl groups for $R^{112}$ include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups.

Examples of the branched or unbranched C2 to C30 (preferably C3 to C25, more preferably C10 to C15)alkenyl groups for $R^{112}$ include vinyl, 1-propenyl, 2-propenyl, 1-butenyl, 2-butenyl, 1-pentenyl, 2-pentenyl, 1-hexenyl, 2-hexenyl, 1-octenyl, decenyl, undecenyl, dodecenyl, tridecenyl, tetradecenyl, pentadecenyl, and octadecenyl groups.

Examples of the C6 to C30 (preferably C10 to C20) aryl groups for $R^{112}$ include phenyl, tolyl, xylyl, naphthyl, and biphenyl groups.

Examples of the C7 to C30 (preferably C10 to C20) aralkyl groups for $R^{112}$ include benzyl and phenethyl groups.

Specific examples of the group represented by $-O-(R^{111}-O)_z-R^{112}$ include $-O-(C_2H_4-O)_5-C_{11}H_{23}$, $-O-(C_2H_4-O)_5-C_{12}H_{25}$, $-O-(C_2H_4-O)_5-C_{13}H_{27}$, $-O-(C_2H_4-O)_5-C_{14}H_{29}$, $-O-(C_2H_4-O)_5-C_{15}H_{31}$, $-O-(C_2H_4-O)_3-C_{13}H_{27}$, $-O-(C_2H_4-O)_4-C_{13}H_{27}$, $-O-(C_2H_4-O)_6-C_{13}H_{27}$, and $-O-(C_2H_4-O)_7-C_{13}H_{27}$. Preferred among these are $-O-(C_2H_4-O)_5-C_{11}H_{23}$, $-O-(C_2H_4-O)_5-C_{13}H_{27}$, $-O-(C_2H_4-O)_5-C_{15}H_{31}$, and $-O-(C_2H_4-O)_6-C_{13}H_{27}$.

Examples of the branched or unbranched C1 to C6 (preferably C1 to C5)alkylene groups for $R^{104}$ include groups as mentioned for the branched or unbranched C1 to C30 alkylene group for $R^{111}$.

Examples of the compounds represented by Formula (1) include 3-mercaptopropyltrimethoxysilane, 3-mercaptopropyltriethoxysilane, 2-mercaptoethyltrimethoxysilane, 2-mercaptoethyltriethoxysilane, and a compound represented by the formula below (Si363 produced by EVONIK-DEGUSSA). The compound represented by the formula can be suitably used. These may be used alone or in combinations of two or more.

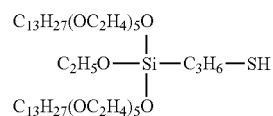

In the following, the compound containing the linking unit A represented by Formula (2) and the linking unit B represented by Formula (3) is described.

When the compound containing the linking unit A represented by Formula (2) and the linking unit B represented by Formula (3) is used, the increase in viscosity during the processing is suppressed as compared to when polysulfide silane such as bis-(3-triethoxysilylpropyl)tetrasulfide is used.

This is presumably because, since the sulfide moiety of the linking unit A is a C—S—C bond, the compound is thermally more stable than tetrasulfide or disulfide, and thus Mooney viscosity is likely to only slightly increase.

Further, the decrease in scorch time is suppressed as compared to when mercapto silane such as 3-mercaptopropyltrimethoxysilane is used. This is presumably because, though the linking unit B has a mercaptosilane structure, the $-C_7H_{15}$ moiety of the linking unit A covers the —SH group of the linking unit B, as a result of which the SH group is less likely to react with polymers and thus scorch is less likely to occur.

In terms of enhancing the effect of suppressing the increase in viscosity during the processing and the effect of suppressing the decrease in scorch time as mentioned above, the linking unit A content in the silane coupling agent having the aforementioned structure is preferably not less than 30 mol %, and more preferably not less than 50 mol %, whereas it is preferably not more than 99 mol %, and more preferably not more than 90 mol %. The linking unit B content is preferably not less than 1 mol %, more preferably not less than 5 mol %, and still more preferably not less than 10 mol %, whereas it is preferably not more than 70 mol %, more preferably not more than 65 mol %, and still more preferably not more than 55 mol %. The combined content of the linking unit A and the linking unit B is preferably not less than 95 mol %, more preferably not less than 98 mol %, and particularly preferably 100 mol %.

It should be noted that the linking unit A or B content refers to the amount including the linking unit A or B that is present at the terminal of the silane coupling agent, if any. In the case where the linking unit A or B is present at the terminal of the silane coupling agent, its form is not particularly limited as long as it forms a unit corresponding to the formula (2) representing the linking unit A or the formula (3) representing the linking unit B.

Examples of the halogens for $R^{201}$ include chlorine, bromine, and fluorine.

Examples of the branched or unbranched C1 to C30 alkyl groups for $R^{201}$ include methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The carbon number of the alkyl group is preferably 1 to 12.

Examples of the branched or unbranched C2 to C30 alkenyl groups for $R^{201}$ include vinyl, 1-propenyl, 2-propenyl, 1-butenyl, 2-butenyl, 1-pentenyl, 2-pentenyl, 1-hexenyl, 2-hexenyl, and 1-octenyl groups. The carbon number of the alkenyl group is preferably 2 to 12.

Examples of the branched or unbranched C2 to C30 alkynyl groups for $R^{201}$ include ethynyl, propynyl, butynyl, pentynyl, hexynyl, heptynyl, octynyl, nonynyl, decynyl, undecynyl, and dodecynyl groups. The carbon number of the alkynyl group is preferably 2 to 12.

Examples of the branched or unbranched C1 to C30 alkylene groups for $R^{202}$ include ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups. The carbon number of the alkylene group is preferably 1 to 12.

Examples of the branched or unbranched C2 to C30 alkenylene groups for $R^{202}$ include vinylene, 1-propenylene, 2-propenylene, 1-butenylene, 2-butenylene, 1-pentenylene, 2-pentenylene, 1-hexenylene, 2-hexenylene, and 1-octenylene groups. The carbon number of the alkenylene group is preferably 2 to 12.

Examples of the branched or unbranched C2 to C30 alkynylene groups for $R^{202}$ include ethynylene, propynylene, butynylene, pentynylene, hexynylene, heptynylene, octynylene, nonynylene, decynylene, undecynylene, and dodecynylene groups. The carbon number of the alkynylene group is preferably 2 to 12.

In the compound containing the linking unit A represented by Formula (2) and the linking unit B represented by Formula (3), the total number of repetitions (x+y) of the number of repetitions (x) of the linking unit A and the number of repetitions (y) of the linking unit B is preferably in the range of 3 to 300. When the total number of repetitions is in the above range, the —$C_7H_{15}$ moiety of the linking unit A covers the mercapto silane of the linking unit B, which makes it possible not only to suppress the decrease in scorch time, but also to ensure good reactivity to silica and the rubber component.

Examples of the compounds containing the linking unit A represented by Formula (2) and the linking unit B represented by Formula (3) include NXT-Z30, NXT-Z45, and NXT-Z60 (all produced by Momentive Performance Materials). These may be used alone or in combinations of two or more.

The amount of the silane coupling agent containing a mercapto group per 100 parts by mass of silica is preferably 0.5 parts by mass or more, more preferably 1.5 parts by mass or more, and still more preferably 2.5 parts by mass or more. If the amount is less than 0.5 parts by mass, silica may not be well dispersed. The amount of the silane coupling agent is preferably 20 parts by mass or less, more preferably 15 parts by mass or less, and still more preferably 10 parts by mass or less. If the amount of the silane coupling agent is increased to more than 20 parts by mass, then the effect of increasing the dispersibility of silica tends not to be further provided, resulting in an unnecessary increase in cost. In addition, scorch time tends to be decreased, thus leading to deterioration in processability in a kneading or extrusion step.

In the present invention, sulfur (cross-linking agent) is usually used.

Examples of sulfur include powdered sulfur, precipitated sulfur, colloidal sulfur, insoluble sulfur, and highly dispersible sulfur.

The amount of sulfur per 100 parts by mass of the rubber component is preferably 0.1 parts by mass or more, and more preferably 0.3 parts by mass or more. If the amount of sulfur is less than 0.1 parts by mass, the cure rate may be decreased, thus resulting in poor productivity. The amount of sulfur is preferably 2.0 parts by mass or less, and more preferably 1.8 parts by mass or less. If the amount of sulfur is more than 2.0 parts by mass, the changes in rubber physical properties may be greater.

The rubber composition of the present invention may appropriately contain, in addition to the components mentioned above, additives such as a softener (e.g. oil), an antioxidant, a vulcanizing agent, a vulcanization accelerator, and a vulcanization accelerator aid, as necessary.

The rubber composition of the present invention can be used for tire components such as treads, sidewalls, and innerliners. The rubber composition can be particularly suitably used for treads because it provides both abrasion resistance and wet-skid performance. Moreover, tires formed therefrom can be suitably used for passenger vehicles, commercial vehicles, two-wheeled vehicles, and the like.

The rubber composition of the present invention may be prepared by a conventional method, for example, by kneading the components described above in a kneading apparatus such as a Banbury mixer, a kneader, an open roll mill or the like, and then vulcanizing the kneaded mixture. Particularly preferred is a production method that involves a kneading process including Step 1 of mixing a rubber component, filler (reinforcing agent), a silane coupling agent, and a softener; Step 2 of mixing the mixture obtained in Step 1 with stearic acid, zinc oxide, and an antioxidant; and Step 3 of mixing the mixture obtained in Step 2 with a vulcanizing agent and a vulcanization accelerator. In general, Steps 1 and 2 are performed as a single kneading step instead of performing Steps 1 and 2 as separate kneading steps. In the present invention, however, since the chemicals such as an antioxidant, zinc oxide, and stearic acid reduce the reaction efficiency of the silane coupling agent, these components and optionally wax are preferably kneaded in the Step 2.

In such a production method including Steps 1 to 3, the kneading temperature is preferably 130° C. to 160° C. in Step 1, 130° C. to 155° C. in Step 2, and 70° C. to 120° C. in Step 3. If each of the kneading temperatures exceeds its upper limit, the rubber compound tends to be degraded.

The pneumatic tire of the present invention may be prepared by a conventional method using the rubber composition. Specifically, the unvulcanized rubber composition containing the aforementioned components is extruded into the shape of a tire component (e.g. tread), and then formed together with other tire components on a tire building machine in a conventional manner to build an unvulcanized tire. The unvulcanized tire is heated and pressurized in a vulcanizing machine to provide a pneumatic tire.

EXAMPLES

The present invention is described more specifically with reference to, but not limited to, examples.

The chemicals used in the examples and comparative examples are listed below.

Modified diene rubbers A and B: Preparation Examples 1 to 10 described below (Oil content in each rubber: 15% by mass)

SBR: SBR1502 (styrene content: 23.5% by mass), a product of JSR Corporation

BR: BR130B, a product of Ube Industries, Ltd.

Silica: Ultrasil VN3 ($N_2SA$: 175 $m^2/g$), a product of EVONIK-DEGUSSA

Carbon black: Diablack I ($N_2SA$: 114 $m^2/g$, DBP oil absorption: 114 ml/100 g), a product of Mitsubishi Chemical Corporation Silane coupling agent 1: Si69 (bis(3-triethoxysilylpropyl) tetrasulfide), a product of EVONIK-DEGUSSA Silane coupling agent 2: NXT-Z45 (a compound containing the linking unit A and the linking unit B (linking unit A: 55 mol %, linking unit B: 45 mol %)), a product of Momentive Performance Materials Silane coupling agent 3: Si363, a product of EVONIK-DEGUSSA Oil: JOMO Process X140, a product of JX Nippon Oil & Energy Corporation Wax: SUNNOC N, a product of Ouchi Shinko Chemical Industrial Co., Ltd.

Antioxidant: NOCRAC 6C (N-(1,3-dimethylbutyl)-N'-phenyl-p-phenylenediamine), a product of Ouchi Shinko Chemical Industrial Co., Ltd.

Stearic acid: TSUBAKI, a product of NOF Corporation

Zinc oxide: Zinc oxide #1, a product of Mitsui Mining & Smelting Co., Ltd.

Sulfur: Seimi sulfur (insoluble sulfur containing 60% of matter insoluble in carbon disulfide and 10% of oil), a product of Nippon Kanryu Industry Co., Ltd.

Vulcanization accelerator TBBS: NOCCELER NS, a product of Ouchi Shinko Chemical Industrial Co., Ltd.

Vulcanization accelerator DPG: NOCCELER D, a product of Ouchi Shinko Chemical Industrial Co., Ltd.

Preparation Example 1

A 20-L stainless steel polymerization reactor was cleaned and dried, and the air therein was replaced with dry nitrogen. To the reactor were then added 1,3-butadiene (548 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, N,N-dimethylaminopropylacrylamide (1.57 mmol, 0.245 g) and 1,3,5-tris(3-trimethoxysilylpropyl) isocyanurate (3.66 mmol, 2.251 g) were added thereto. After the reaction was allowed to proceed with stirring for 30 minutes, methanol (10 ml) was added thereto and the mixture was further stirred for five minutes. Then, the contents were taken out from the polymerization reactor, and 2,6-di-t-butyl-p-cresol (SUMILIZER BHT produced by Sumitomo Chemical Co., Ltd., the same shall apply hereinafter) (10 g) and oil (141 g) were added thereto. Most of the hexane was distilled off, and the resulting mixture was dried under reduced pressure at 55° C. for 12 hours to give a rubber mixture 1.

Preparation Example 2

A rubber mixture 2 was prepared in the same manner as in Preparation Example 1, except that the amount of N,N-dimethylaminopropylacrylamide was changed to 0.52 mmol (0.082 g) and the amount of 1,3,5-tris(3-trimethoxysilylpropyl) isocyanurate was changed to 4.70 mmol (2.894 g).

Preparation Example 3

A rubber mixture 3 was prepared in the same manner as in Preparation Example 1, except that the amount of N,N-dimethylaminopropylacrylamide was changed to 4.70 mmol (0.734 g) and the amount of 1,3,5-tris(3-trimethoxysilylpropyl) isocyanurate was changed to 0.52 mmol (0.322 g).

Preparation Example 4

A rubber mixture 4 was prepared in the same manner as in Preparation Example 1, except that the amount of tetrahydrofuran was changed to 31.12 g; the amount of n-butyllithium (a solution in n-hexane) was changed to 18.28 mmol; the amount of N,N-dimethylaminopropylacrylamide was changed to 1.83 mmol (0.286 g); and the amount of 1,3,5-tris(3-trimethoxysilylpropyl) isocyanurate was changed to 16.45 mmol (10.131 g).

Preparation Example 5

A rubber mixture 5 was prepared in the same manner as in Preparation Example 1, except that the amount of tetrahydrofuran was changed to 31.12 g; the amount of n-butyllithium (a solution in n-hexane) was changed to 18.28 mmol; the amount of N,N-dimethylaminopropylacrylamide was changed to 16.45 mmol (2.57 g); and the amount of 1,3,5-tris(3-trimethoxysilylpropyl) isocyanurate was changed to 1.83 mmol (1.126 g).

Preparation Example 6

A rubber mixture 6 was prepared in the same manner as in Preparation Example 1, except that the amount of tetrahydrofuran was changed to 4.15 g; the amount of n-butyllithium (a solution in n-hexane) was changed to 2.44 mmol; the amount of N,N-dimethylaminopropylacrylamide was changed to 0.24 mmol (0.038 g); and the amount of 1,3,5-tris(3-trimethoxysilylpropyl) isocyanurate was changed to 2.19 mmol (1.351 g).

Preparation Example 7

A rubber mixture 7 was prepared in the same manner as in Preparation Example 1, except that the amount of tetrahydrofuran was changed to 4.15 g; the amount of n-butyllithium (a solution in n-hexane) was changed to 2.44 mmol, the amount of N,N-dimethylaminopropylacrylamide was changed to 2.19 mmol (0.343 g); and the amount of 1,3,5-tris(3-trimethoxysilylpropyl) isocyanurate was changed to 0.24 mmol (0.15 g).

Preparation Example 8

A rubber mixture 8 was prepared in the same manner as in Preparation Example 1, except that the amount of tetrahydrofuran was changed to 4.15 g; the amount of n-butyllithium (a solution in n-hexane) was changed to 2.44 mmol; the amount of N,N-dimethylaminopropylacrylamide was changed to 0 mmol (0 g); and the amount of 1,3,5-tris(3-trimethoxysilylpropyl)isocyanurate was changed to 2.44 mmol (1.501 g).

Preparation Example 9

A rubber mixture 9 was prepared in the same manner as in Preparation Example 1, except that the amount of tetrahydrofuran was changed to 4.15 g; the amount of n-butyllithium (a solution in n-hexane) was changed to 2.44 mmol; the amount of N,N-dimethylaminopropylacrylamide was changed to 2.44 mmol (0.381 g); and the amount of 1,3,5-tris(3-trimethoxysilylpropyl)isocyanurate was changed to 0 mmol (0 g).

Preparation Example 10

A 20-L stainless steel polymerization reactor was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, N,N-dimethylaminopropylacrylamide (5.22 mmol, 0.816 g) was added thereto. After the reaction was allowed to proceed with stirring for 30 minutes, methanol (10 ml) was added thereto, and the mixture was further stirred for five minutes (modified diene rubber A).

Separately, a 20-L stainless steel polymerization reactor was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, 1,3,5-tris(3-trimethoxysilylpropyl) isocyanurate (5.22 mmol, 3.216 g) was added thereto. After the reaction was allowed to proceed with stirring for 30 minutes, methanol (10 ml) was added thereto, and the mixture was further stirred for five minutes (modified diene rubber B).

Then, the contents were taken out from each of the polymerization reactors, and these two mixtures were mixed together so that the blending ratio of the modified diene rubbers A and B (mass ratio of A/B) was 30/70. Thereto were added 2,6-di-t-butyl-p-cresol (10 g) and oil (141 g). Most of the hexane was distilled off, and the resulting mixture was dried under reduced pressure at 55° C. for 12 hours to give a rubber mixture 10.

Examples and Comparative Examples

In accordance with each formulation shown in Tables 1 and 2 (the amount of sulfur in the tables means the net sulfur content in the Seimi sulfur), the materials listed in the column "Step 1" were kneaded for five minutes in a 1.7-L Banbury mixer so that the target outlet temperature shown in the table was reached. Thus, a kneaded mixture was obtained. Subsequently, the materials listed in the column "Step 2" were added to the kneaded mixture obtained in Step 1, and they were kneaded at 140° C. for three minutes to provide a kneaded mixture. Thereafter, the kneaded mixture obtained in Step 2 was mixed with the materials listed in the column "Step 3", and they were kneaded in an open roll mill for three minutes at 80° C. to provide an unvulcanized rubber composition.

The unvulcanized rubber composition was press-vulcanized at 150° C. for 20 minutes to provide a vulcanized rubber sheet.

Separately, the unvulcanized rubber composition was formed into the shape of a tread having a thickness of 10 mm, then assembled with other tire components and vulcanized at 170° C. for 15 minutes to prepare a test tire (tire size: 215/45ZR17).

The unvulcanized rubber compositions, vulcanized rubber sheets, test tires thus obtained were subjected to the following evaluations. The test results are shown in Tables 1 and 2.

(Scorch Time)

Each unvulcanized rubber composition was subjected to a Mooney scorch test in accordance with the physical testing method of unvulcanized rubber set forth in JIS K6300, to measure t10 [minutes] at 130.0±0.5° C. The t10 is expressed as an index relative to a value of 100 representing the t10 of the reference comparative example. A short scorch time tends to cause the problem of compound scorch. In this evaluation, if the index is 70 or less, the problem of compound scorch may occur in, for example, a final kneading step or extrusion step.

(Rolling Resistance Index)

Using a viscoelastic spectrometer VES (Iwamoto Seisakusho Co., Ltd.), the tan $\delta$ of the vulcanized rubber sheet of each formulation was measured at 70° C., an initial strain of 10%, and a dynamic strain of 2%. The tan $\delta$ of each formulation is expressed as an index relative to a value of 100 representing the tan $\delta$ of Comparative Example 1, according to the equation below. A higher index indicates lower rolling resistance and thus better fuel economy.

(Rolling resistance index)=(tan $\delta$ of Comparative Example 1)/(tan $\delta$ of each formulation)×100

(Wet-Skid Performance)

Each set of test tires was mounted on all wheels of a car (a front-engine, front-wheel-drive car, 2000 cc, made in Japan). The car's braking distance from an initial speed of 100 km/h was measured on a wet asphalt road. The braking distance of each formulation is expressed as an index relative to a value of 100 representing the braking distance of Comparative Example 1, according to the equation below. A higher index indicates better wet-skid performance.

(Wet-skid performance)=(Braking distance of Comparative Example 1)/(Braking distance of each formulation)×100

(Abrasion Resistance)

Each set of test tires was mounted on all wheels of a car (a front-engine, front-wheel-drive car, 2000 cc, made in Japan), and the car was driven on a test track. Then, the change in the tread pattern groove depth between before and after 30,000 km of driving was measured. The result of each formulation is expressed as an index relative to a value of 100 representing the change in groove depth of Comparative Example 1, according to the equation below. A higher index indicates better abrasion resistance.

(Abrasion resistance)=(Change in groove depth of Comparative Example 1)/(Change in groove depth of each formulation)×100

TABLE 1

| | | | Example 1 | Example 2 | Example 3 | Example 4 | Example 5 | Example 6 | Example 7 | Example 8 |
|---|---|---|---|---|---|---|---|---|---|---|
| Formulation (parts by mass) | Step 1 | Modified diene rubbers A and B | 23.6 | 70.8 | 118 | 23.6 | 23.6 | 23.6 | 70.8 | 70.8 |
| | | SBR | 60 | 20 | — | 60 | 60 | 60 | 20 | 20 |
| | | BR | 20 | 20 | — | 20 | 20 | 20 | 20 | 20 |
| | | Silica | 50 | 50 | 50 | 50 | 50 | 50 | 50 | 50 |
| | | Carbon black | 40 | 40 | 40 | 40 | 40 | 40 | 40 | 40 |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  |  | Silane coupling agent 1 (Si69) | — | — | — | — | — | — | — | — |
|  |  | Silane coupling agent 2 (NXT) | 2 | 2 | 2 | 2 | 2 | 2 | — | 2 |
|  |  | Silane coupling agent 3 (Si363) | — | — | — | — | — | — | 2 | — |
|  |  | Oil | 26.4 | 19.2 | 12 | 26.4 | 26.4 | 26.4 | 19.2 | 19.2 |
|  | Step 2 | Wax | 2 | 2 | 2 | 2 | 2 | 2 | 2 | 2 |
|  |  | Antioxidant | 2 | 2 | 2 | 2 | 2 | 2 | 2 | 2 |
|  |  | Stearic acid | 2 | 2 | 2 | 2 | 2 | 2 | 2 | 2 |
|  |  | Zinc oxide | 3 | 3 | 3 | 3 | 3 | 3 | 3 | 3 |
|  | Step 3 | Sulfur | 1.8 | 1.8 | 1.8 | 1.8 | 1.8 | 1.8 | 1.8 | 1.8 |
|  |  | Vulcanization accelerator TBBS | 2 | 2 | 2 | 2 | 2 | 2 | 2 | 2 |
|  |  | Vulcanization accelerator DPG | 1.5 | 1.5 | 1.5 | 1.5 | 1.5 | 1.5 | 1.5 | 1.5 |
| Contents of modified diene rubbers A and B | Rubber mixture |  | Preparation Example 1 | Preparation Example 1 | Preparation Example 1 | Preparation Example 2 | Preparation Example 3 | Preparation Example 10 | Preparation Example 1 | Preparation Example 1 |
|  | Styrene content (% by mass) |  | 30 | 30 | 30 | 30 | 30 | 30 | 30 | 30 |
|  | Vinyl bond content (% by mass) |  | 35 | 35 | 35 | 35 | 35 | 35 | 35 | 35 |
|  | Ratio of modified diene rubber A |  | 30 | 30 | 30 | 10 | 90 | 30 | 30 | 30 |
|  | Ratio of modified diene rubber B |  | 70 | 70 | 70 | 90 | 10 | 70 | 70 | 70 |
|  | Weight average molecular weight (million) |  | 0.7 | 0.7 | 0.7 | 0.7 | 0.7 | 0.7 | 0.7 | 0.7 |
| Outlet temperature (° C.) in Step 1 |  |  | 150 | 150 | 150 | 150 | 150 | 150 | 150 | 165 |
| Evaluation | Scorch time |  | 104 | 103 | 102 | 104 | 104 | 104 | 95 | 90 |
|  | Wet-skid performance |  | 110 | 120 | 130 | 105 | 110 | 110 | 120 | 120 |
|  | Abrasion resistance |  | 118 | 125 | 120 | 120 | 115 | 118 | 125 | 130 |
|  | Rolling resistance index |  | 118 | 120 | 115 | 115 | 120 | 118 | 120 | 125 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Formulation (parts by mass) | Step 1 | Modified diene rubbers A and B | — | 23.6 | 70.8 | 118 | 23.6 | 23.6 | 23.6 |
|  |  | SBR | 80 | 60 | 20 | — | 60 | 60 | 60 |
|  |  | BR | 20 | 20 | 20 | — | 20 | 20 | 20 |
|  |  | Silica | 50 | 50 | 50 | 50 | 50 | 50 | 50 |
|  |  | Carbon black | 40 | 40 | 40 | 40 | 40 | 40 | 40 |
|  |  | Silane coupling agent 1 (Si69) | 4 | 4 | 4 | 4 | 4 | 4 | 4 |
|  |  | Silane coupling agent 2 (NXT) | — | — | — | — | — | — | — |
|  |  | Silane coupling agent 3 (Si363) | — | — | — | — | — | — | — |
|  |  | Oil | 30 | 26.4 | 19.2 | 12 | 26.4 | 26.4 | 26.4 |
|  | Step 2 | Wax | 2 | 2 | 2 | 2 | 2 | 2 | 2 |
|  |  | Antioxidant | 2 | 2 | 2 | 2 | 2 | 2 | 2 |
|  |  | Stearic acid | 2 | 2 | 2 | 2 | 2 | 2 | 2 |
|  |  | Zinc oxide | 3 | 3 | 3 | 3 | 3 | 3 | 3 |
|  | Step 3 | Sulfur | 1.8 | 1.8 | 1.8 | 1.8 | 1.8 | 1.8 | 1.8 |
|  |  | Vulcanization accelerator TBBS | 2 | 2 | 2 | 2 | 2 | 2 | 2 |
|  |  | Vulcanization accelerator DPG | 1.5 | 1.5 | 1.5 | 1.5 | 1.5 | 1.5 | 1.5 |
| Contents of modified diene rubbers A and B | Rubber mixture |  | — | Preparation Example 1 | Preparation Example 1 | Preparation Example 1 | Preparation Example 2 | Preparation Example 3 | Preparation Example 4 |
|  | Styrene content (% by mass) |  | — | 30 | 30 | 30 | 30 | 30 | 30 |
|  | Vinyl bond content (% by mass) |  | — | 35 | 35 | 35 | 35 | 35 | 35 |
|  | Ratio of modified diene rubber A |  | — | 30 | 30 | 30 | 10 | 90 | 10 |
|  | Ratio of modified diene rubber B |  | — | 70 | 70 | 70 | 90 | 10 | 90 |
|  | Weight average molecular weight (million) |  | — | 0.7 | 0.7 | 0.7 | 0.7 | 0.7 | 0.2 |
| Outlet temperature in Step 1 |  |  | 150 | 150 | 150 | 150 | 150 | 150 | 150 |
| Evaluation | Scorch time |  | 100 | 99 | 98 | 97 | 99 | 99 | 99 |
|  | Wet-skid performance |  | 100 | 109 | 120 | 130 | 105 | 109 | 105 |
|  | Abrasion resistance |  | 100 | 108 | 115 | 110 | 110 | 105 | 98 |
|  | Rolling resistance index |  | 100 | 108 | 109 | 105 | 105 | 109 | 108 |

TABLE 2-continued

|  |  |  | Comparative Example 8 | Comparative Example 9 | Comparative Example 10 | Comparative Example 11 | Comparative Example 12 | Comparative Example 13 |
|---|---|---|---|---|---|---|---|---|
| Formulation (parts by mass) | Step 1 | Modified diene rubbers A and B | 23.6 | 23.6 | 23.6 | 23.6 | 23.6 | — |
|  |  | SBR | 60 | 60 | 60 | 60 | 60 | 80 |
|  |  | BR | 20 | 20 | 20 | 20 | 20 | 20 |
|  |  | Silica | 50 | 50 | 50 | 50 | 50 | 50 |
|  |  | Carbon black | 40 | 40 | 40 | 40 | 40 | 40 |
|  |  | Silane coupling agent 1 (Si69) | 4 | 4 | 4 | 4 | 4 | — |
|  |  | Silane coupling agent 2 (NXT) | — | — | — | — | — | 2 |
|  |  | Silane coupling agent 3 (Si363) | — | — | — | — | — | — |
|  |  | Oil | 26.4 | 26.4 | 26.4 | 26.4 | 26.4 | 30 |
|  | Step 2 | Wax | 2 | 2 | 2 | 2 | 2 | 2 |
|  |  | Antioxidant | 2 | 2 | 2 | 2 | 2 | 2 |
|  |  | Stearic acid | 2 | 2 | 2 | 2 | 2 | 2 |
|  |  | Zinc oxide | 3 | 3 | 3 | 3 | 3 | 3 |
|  | Step 3 | Sulfur | 1.8 | 1.8 | 1.8 | 1.8 | 1.8 | 1.8 |
|  |  | Vulcanization accelerator TBBS | 2 | 2 | 2 | 2 | 2 | 2 |
|  |  | Vulcanization accelerator DPG | 1.5 | 1.5 | 1.5 | 1.5 | 1.5 | 1.5 |
| Contents of modified diene rubbers A and B |  | Rubber mixture | Preparation Example 5 | Preparation Example 6 | Preparation Example 7 | Preparation Example 8 | Preparation Example 9 | — |
|  |  | Styrene content (% by mass) | 30 | 30 | 30 | 30 | 30 | — |
|  |  | Vinyl bond content (% by mass) | 35 | 35 | 35 | 35 | 35 | — |
|  |  | Ratio of modified diene rubber A | 90 | 10 | 90 | — | 100 | — |
|  |  | Ratio of modified diene rubber B | 10 | 90 | 10 | 100 | — | — |
|  |  | Weight average molecular weight (million) | 0.2 | 1.5 | 1.5 | 0.7 | 0.7 | — |
| Outlet temperature in Step 1 |  |  | 150 | 150 | 150 | 150 | 150 | 150 |
| Evaluation | Scorch time |  | 99 | 99 | 99 | 99 | 99 | 104 |
|  | Wet-skid performance |  | 109 | 105 | 109 | 109 | 109 | 110 |
|  | Abrasion resistance |  | 95 | 99 | 99 | 110 | 110 | 100 |
|  | Rolling resistance index |  | 113 | 108 | 113 | 99 | 99 | 110 |

In Comparative Example 1, in which the modified diene rubbers A and B were not used and the silane coupling agent 1 (Si69) containing no mercapto group was used, the rolling resistance index, abrasion resistance, and wet-skid performance were inferior to those in the examples. In Comparative Examples 2 to 13, in which the modified diene rubbers A and B were used but no silane coupling agent containing a mercapto group was used, the dispersibility of silica was poor and the properties were not improved as much as those in the examples.

On the other hand, in the examples, in which the modified diene rubbers A and B and the silane coupling agent 2 or 3 (NXT-Z45 or Si363) containing a mercapto group were used in combination, a balanced improvement in all the properties, abrasion resistance, rolling resistance index and wet-skid performance, was achieved while a good scorch time was provided. This indicates that the balance between the above properties was synergistically improved while good processability was provided. In particular, in Example 8, in which NXT-Z45 was used and the outlet temperature in Step 1 was set to be higher than that in Example 2 to perform kneading at a high temperature, the rolling resistance index and abrasion resistance were markedly improved; in addition, the scorch time was not decreased so much and thus there was no problem with processability. Also in Example 7, in which Si363 was used, the balance among rolling resistance index, abrasion resistance, wet-skid performance was excellent, and no problem with processability was observed.

The invention claimed is:

1. A rubber composition for tires, comprising:
a modified diene rubber A which has been modified with an acrylamide compound represented by the following Formula (I):

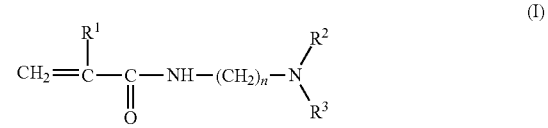

wherein $R^1$ represents hydrogen or a methyl group; $R^2$ and $R^3$ each represent an alkyl group; and n represents an integer;
a modified diene rubber B which has been modified with a silicon or tin compound represented by the Formula (II) below and a modifying compound represented by the Formula (III) below or with a modifying compound represented by the Formula (III) below:

wherein R represents an alkyl group, an alkenyl group, a cycloalkenyl group, or an aromatic hydrocarbon group; M represents silicon or tin; X represents a halogen; a represents an integer of 0 to 2; and b represents an integer of 2 to 4;

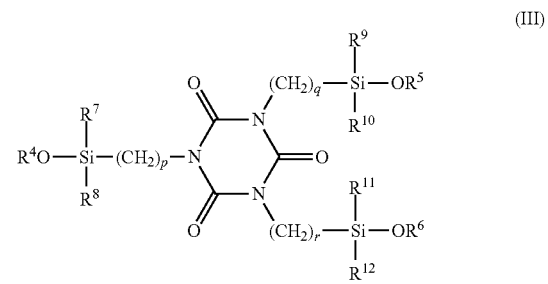

wherein $R^4$ to $R^6$ are the same as or different from one another, each representing a C1 to C8 alkyl group; $R^7$ to $R^{12}$ are the same as or different from one another, each representing a C1 to C8 alkoxy or alkyl group; and p to r are the same as or different from one another, each representing an integer of 1 to 8; and a silane coupling agent containing a mercapto group, the modified diene rubbers A and B, taken as a whole, having a weight average molecular weight of 300,000 to 1,400,000.

2. The rubber composition for tires according to claim 1, wherein the modified diene rubbers A and B comprise a mixture obtained by polymerizing a conjugated diene monomer alone or with an aromatic vinyl monomer in the presence of an alkali metal catalyst in a hydrocarbon solvent to produce an active alkali metal-terminated conjugated diene polymer, and reacting the conjugated diene polymer with the acrylamide compound and with a combination of the silicon or tin compound and the modifying compound or the modifying compound.

3. The rubber composition for tires according to claim 1, wherein, in the modifying compound, each of $R^4$ to $R^6$ is a methyl, ethyl, propyl, or butyl group; each of $R^7$ to $R^{12}$ is a methoxy, ethoxy, propoxy, or butoxy group; and each of p to r is an integer of 2 to 5.

4. The rubber composition for tires according to claim 1, wherein the silane coupling agent containing a mercapto group is at least one of a compound represented by the Formula (1) below and a compound containing a linking unit A represented by the Formula (2) below and a linking unit B represented by the Formula (3) below:

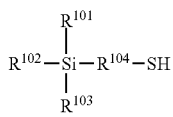
(1)

wherein $R^{101}$ to $R^{103}$ each represent a branched or unbranched C1 to C12 alkyl group, a branched or unbranched C1 to C12 alkoxy group, or a group represented by —O—$(R^{111}$—O$)_z$—$R^{112}$, wherein each $R^{111}$ represents a branched or unbranched C1 to C30 divalent hydrocarbon group, and the $R^{111}$ groups are the same as or different from one another; $R^{112}$ represents a branched or unbranched C1 to C30 alkyl group, a branched or unbranched C2 to C30 alkenyl group, a C6 to C30 aryl group, or a C7 to C30 aralkyl group; and z represents an integer of 1 to 30, and $R^{101}$ to $R^{103}$ may be the same as or different from one another; and $R^{104}$ represents a branched or unbranched C1 to C6 alkylene group;

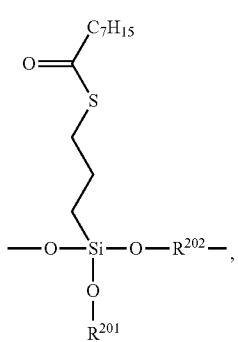
(2)

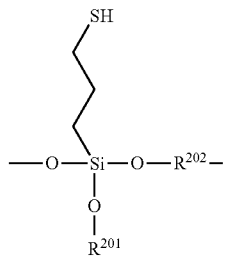
(3)

wherein $R^{201}$ represents hydrogen, a halogen, a branched or unbranched C1 to C30 alkyl group, a branched or unbranched C2 to C30 alkenyl group, a branched or unbranched C2 to C30 alkynyl group, or the alkyl group in which a terminal hydrogen atom is replaced with a hydroxy or carboxy group; and $R^{202}$ represents a branched or unbranched C1 to C30 alkylene group, a branched or unbranched C2 to C30 alkenylene group, or a branched or unbranched C2 to C30 alkynylene group, provided that $R^{201}$ and $R^{202}$ together may form a ring structure.

5. A pneumatic tire, comprising a tread formed from the rubber composition according to claim 1.

6. The rubber composition for tires according to claim 2, wherein, in the modifying compound, each of $R^4$ to $R^6$ is a methyl, ethyl, propyl, or butyl group; each of $R^7$ to $R^{12}$ is a methoxy, ethoxy, propoxy, or butoxy group; and each of p to r is an integer of 2 to 5.

7. The rubber composition for tires according to claim 2, wherein the silane coupling agent containing a mercapto group is at least one of a compound represented by the Formula (1) below and a compound containing a linking unit A represented by the Formula (2) below and a linking unit B represented by the Formula (3) below:

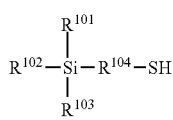
(1)

wherein $R^{101}$ to $R^{103}$ each represent a branched or unbranched C1 to C12 alkyl group, a branched or unbranched C1 to C12 alkoxy group, or a group represented by —O—$(R^{111}$—O$)_z$—$R^{112}$, wherein each $R^{111}$ represents a branched or unbranched C1 to C30 divalent hydrocarbon group, and the $R^{111}$ groups may be the same as or different from one another; $R^{112}$ represents a branched or unbranched C1 to C30 alkyl group, a branched or unbranched C2 to C30 alkenyl group, a C6 to C30 aryl group, or a C7 to C30 aralkyl group; and z represents an integer of 1 to 30, and $R^{101}$ to $R^{103}$ may be the same as or different from one another; and $R^{104}$ represents a branched or unbranched C1 to C6 alkylene group;

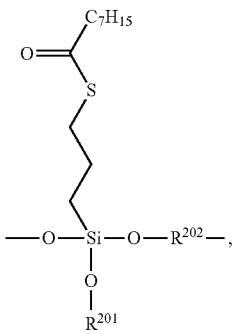

(2)

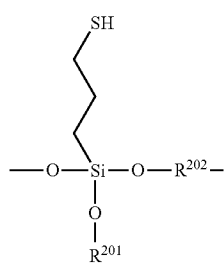

(3)

wherein $R^{201}$ represents hydrogen, a halogen, a branched or unbranched C1 to C30 alkyl group, a branched or unbranched C2 to C30 alkenyl group, a branched or unbranched C2 to C30 alkynyl group, or the alkyl group in which a terminal hydrogen atom is replaced with a hydroxy or carboxy group; and $R^{202}$ represents a branched or unbranched C1 to C30 alkylene group, a branched or unbranched C2 to C30 alkenylene group, or a branched or unbranched C2 to C30 alkynylene group, provided that $R^{201}$ and $R^{202}$ together may form a ring structure.

8. The rubber composition for tires according to claim 3, wherein the silane coupling agent containing a mercapto group is at least one of a compound represented by the Formula (1) below and a compound containing a linking unit A represented by the Formula (2) below and a linking unit B represented by the Formula (3) below:

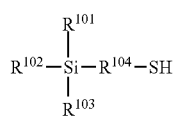

(1)

wherein $R^{101}$ to $R^{103}$ each represent a branched or unbranched C1 to C12 alkyl group, a branched or unbranched C1 to C12 alkoxy group, or a group represented by —O—$(R^{111}—O)_zR^{112}$, wherein each $R^{111}$ represents a branched or unbranched C1 to C30 divalent hydrocarbon group, and the $R^{111}$ groups may be the same as or different from one another; $R^{112}$ represents a branched or unbranched C1 to C30 alkyl group, a branched or unbranched C2 to C30 alkenyl group, a C6 to C30 aryl group, or a C7 to C30 aralkyl group; and z represents an integer of 1 to 30, and $R^{101}$ to $R^{103}$ may be the same as or different from one another; and $R^{104}$ represents a branched or unbranched C1 to C6 alkylene group;

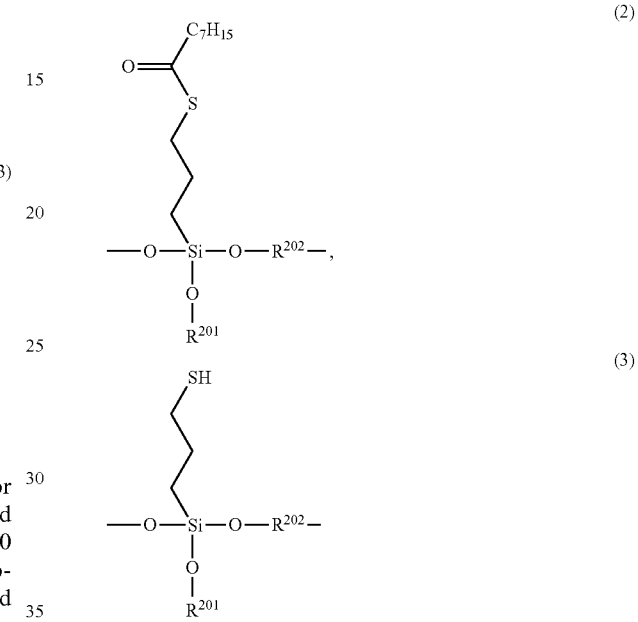

wherein $R^{201}$ represents hydrogen, a halogen, a branched or unbranched C1 to C30 alkyl group, a branched or unbranched C2 to C30 alkenyl group, a branched or unbranched C2 to C30 alkynyl group, or the alkyl group in which a terminal hydrogen atom is replaced with a hydroxy or carboxy group; and $R^{202}$ represents a branched or unbranched C1 to C30 alkylene group, a branched or unbranched C2 to C30 alkenylene group, or a branched or unbranched C2 to C30 alkynylene group, provided that $R^{201}$ and $R^{202}$ together may form a ring structure.

9. A pneumatic tire, comprising
a tread formed from the rubber composition according to claim 2.

10. A pneumatic tire, comprising
a tread formed from the rubber composition according claim 3.

11. A pneumatic tire, comprising
a tread formed from the rubber composition according to claim 4.

* * * * *